Patented June 12, 1951

2,556,727

UNITED STATES PATENT OFFICE 2,556,727

PROCESS OF FINISHING PHTHALOCYANINE PIGMENTS

Frank Wesley Lane, Elkton, Md., and Arthur John Stratton, West Orange, N. J., assignors to E. I. du Pont de Nemours & Company, Wilmington, Del., a corporation of Delaware No Drawing. Application March 5, 1949, Serial No. 79,903

8 Claims. (Cl. 260—314.5)

This invention relates to a new process for finishing phthalocyanine coloring matters in a finely divided, solid state, exhibiting high tinctorial strength and excellent pigmentary properties in general. More particularly, this invention relates to an improved process for finishing copper-phthalocyanine, metal-free phthalocyanine and chlorinated derivatives of either, in a finely divided, pigmentary state.

Phthalocyanine coloring matters are a well known class of compounds enjoying wide use as colored pigments because of their brilliance of shade, high tinctorial strength, and remarkable stability under a wide variety of conditions of use. The commercial forms are generally blues and greens, and for the most part they are derivatives of copper-phthalocyanine.

It is well recognized in the art that crude copper-phthalocyanine, i. e. the product obtained directly in the synthesis thereof, has relatively little value as a pigment. It is generally composed of large particles, in the order of 25 to 50 microns in length, and consequently exhibits very low tinctorial strength, and is quite dull in shade. The same is true of other phthalocyanine compounds and of at least some of the methods of producing metal-free phthalocyanine.

Two methods have been proposed heretofore for converting the large-particle size, crude phthalocyanine compounds to a pigmentary state of very fine sub-division exhibiting high tinctorial strength and brilliance of shade. The most widely described method of accomplishing this purpose is the so-called acid-pasting process. This process involves dissolving the phthalocyanine coloring matter in concentrated sulfuric acid and then precipitating the pigment by very rapid dilution of the sulfuric acid solution with water. Most commercial phthalocyanine pigments heretofore have been made by this method, but the method suffers from certain inherent disadvantages, resulting from the required use of large quantities of sulfuric acid, such as high cost of the acid and the problem of disposal of the acid waste. The method also imparts certain disadvantageous properties to the resulting pigment. For instance, if the pigment is dried without further treatment, it almost invariably becomes hard in texture and is very difficult to incorporate in the usual vehicles of coating compositions or printing inks. A second disadvantage resides in a pronounced tendency of the acid-pasted pigment to "flocculate" in enamels, lacquers, and similar compositions. This phenomenon is well known to the art and is adequately described in U. S. Patent 2,452,606.

A second proposed method of finishing phthalocyanine pigments is to grind them in a ball mill with relatively large amounts of a water-soluble salt such as sodium chloride. This process is described in U. S. Patent 2,402,167 but still has certain inherent economic disadvantages.

In other branches of the pigment industry, notably in the manufacture of calcined white pigments such as lithopone and titanium dioxide, certain wet grinding procedures (in water) have been resorted to in order to reduce the calcined products to a pigmentary state. It has been proposed to finish phthalocyanine pigments by wet grinding them under similar circumstances, but all such proposals have failed to achieve the object. The method of wet grinding phthalocyanines with ceramic or metallic balls (in water) has proven incapable of reducing the particle size to anything below 2 microns, whereas it is generally agreed that phthalocyanine coloring matters of satisfactory pigmentary properties range in size from about .01 micron to a maximum of perhaps .2 micron. Moreover, with some forms of phthalocyanine pigments, notably the highly chlorinated copper phthalocyanine, we not only failed to obtain pigmentary properties, but we found that ball-milling of the product in water actually destroys the usefulness of an already finished pigment.

It is accordingly an object of this invention to provide an improved and economical process for reducing crude phthalocyanine compounds to a fine particle size of high tinctorial qualities. Other and further important objects of this invention will appear as the description proceeds.

Our method of achieving these objects is based on the surprising discovery that phthalocyanine pigments of fine particle size and excellent pigmentary properties in general can be obtained by subjecting the crude color to ball-milling under the following two special conditions:

1. The use of organic liquids as the suspending medium, particularly the lower boiling hydrocarbons and certain oxygenated aliphatic compounds such as the lower ketones, alcohols, ethers, and amides.

2. The use of grinding balls not larger than 0.25 inch in diameter and preferably not smaller than about 0.10 inch.

The results are particularly surprising when it is considered that the use of water with the same size of grinding balls does not give the desired result. Likewise, the use of the above organic liquids, but with the larger balls of the prior art gives products which fall far short of the desired properties. It is only when the two features hereinabove are combined that the improved effects of this invention can be achieved.

This invention, accordingly, resides in a novel process in which a phthalocyanine coloring matter is converted into a pigmentary state by grinding the crude pigment in any one of a variety of organic liquids, through the action of small balls or other grinding medium, contained in any suitable device such as a ball mill. The balls may be made of any convenient material of construction; iron and steel are preferred because of their cheapness and ready availability, but other metals, such as copper, may be used if desired. Small glass beads or small particles of gravel have also been used successfully. However, the rate of grinding is somewhat more rapid with materials of higher specific gravity.

The size of the balls usable for practical operation appears to lie in a relatively narrow range from about 0.1 in. to about 0.25 in. in diameter. With balls substantially larger than 0.25 in. in diameter there is a marked reduction in the rate of grinding and the minimum particle size obtainable shows a marked increase. On the other hand, the lower limit of 0.1 inch is put on purely from the viewpoint of facilitating isolation of the product, inasmuch as the filtering or straining procedure becomes slow and complicated if the size of the grinding medium selected is much below the stated limit.

The choice of organic liquid as the suspending medium seems to depend more on the physical characteristics of the liquid than upon any recognizable chemical properties thereof. Obviously, it should be free of groups or radicals which would tend to react with or corrode the grinding medium. For instance, for use with steel balls, the liquid should be free of sulfo, carboxy or aldehyde radicals. Apart from this simple precaution, however, a wide variety of organic liquids are applicable. Both aromatic and aliphatic hydrocarbons have been used by us, including xylene, mineral spirits, and kerosene. We have also used a number of oxygenated compounds such as acetone, dioxane, methanol, ethanol, isopropanol, the ethyl ether of ethylene glycol, methyl acetate, ethyl acetate, and dimethyl formamide.

The problem from the practical point of view is merely one of ease with which the pigment can be separated from the liquid subsequent to the grinding operation. From this aspect, water miscible liquids with boiling point preferably below that of water are much to be preferred, because of the ease with which the liquids can be recovered by conventional fractional distillation, leaving the pigment in a desirable aqueous suspension for subsequent chemical extraction or even for direct use for certain purposes. On the other hand, water immiscible liquids, such as the hydrocarbons can also be used, provided they boil at a point below 250° C., or within a range essentially below 250° C., so as to permit their removal by steam distillation.

To carry out this invention in its broadest practical aspects, one selects a convenient device, preferably a ball mill, of any suitable size. One adds to this mill a load of steel balls with an average diameter of about ⅛ inch and in sufficient amounts to occupy about 40% of the gross volume of the mill. One then adds a suitable amount of phthalocyanine pigment and sufficient organic liquid, such as acetone, to give a fluid mass. The mill is then rotated at a suitable speed, preferably about 70% of the critical speed, the latter being defined as that speed at which the centrifugal force is just sufficient to maintain the balls in contact with the shell of the mill near its apex. Rotation of the mill is continued for a predetermined time or until a suitable particle size is obtained; the result is a rather viscous slurry of the pigment in the liquid, and it is sometimes necessary to add additional liquid during the grinding operation to maintain the mass in a sufficiently fluid state. At the end of the grinding operation, the fluid paste is discharged from the mill, usually after some dilution with additional liquid. The liquid is then removed from the pigment by any suitable means, preferably one which will leave the pigment in an aqueous slurry. For certain purposes, the pigment may be used in this condition. For other purposes, it is best to subject the slurry to certain extraction operations to remove impurities, and ultimately to dry the pigment to a powder.

When the liquid used is acetone or other low boiling, water-miscible liquid, it is preferred to dilute the mixture somewhat with water and to recover the acetone, or other liquid, by conventional distillation procedure using open steam as the source of heat. Such an operation leaves the pigment in a desirable aqueous slurry in suitable form for chemical extraction. When the liquid by steam distillation which, when properly mineral spirits, it is preferred to remove the liquid by steam distillation which, when properly carried out, leaves the pigment in an aqueous suspension suitable for chemical extraction. It is, of course, also possible to remove the liquid in either event by a simple drying operation, and to recover the liquid by suitable condensation of the gases from the dryer.

Without limiting this invention, the following examples describe various modifications of the process of this invention in more detail.

*Example 1*

Forty-five pounds of a copper-phthalocyanine pigment containing about 4.5% chlorine (obtained by the reaction of 4-chloro-phthalic acid, phthalic anhydride, urea and copper chloride in the presence of a suitable liquid carrier) together with 315 pounds of acetone (98–99% purity) were charged into a ball mill of about 200 gallons capacity (39 in. internal diameter by 39 in. long) containing about 3600 pounds of steel shot with an average diameter of about ⅛ in. (40% nominal ball load). The mill was rotated at a speed of about 31 R. P. M. for 48 hours, the charge was then diluted with about 200 pounds of acetone, discharged from the mill and pumped to an acetone recovery still. The acetone was then removed by boiling with open steam and was recovered by the aid of a reflux column.

The residual aqueous slurry of the pigment was extracted by boiling with a 2% solution of sulfuric acid, filtered, washed free of sulfate ion, reslurried in sufficient water to give a slurry containing about 5% of pigment and again extracted by heating near the boil with a 3% solution of ammonium hydroxide. It was then filtered, washed free of alkali and subsequently dried at about 60° C., which gave a brilliant blue dry powder adaptable for use as a phthalocyanine pigment of highly desirable, and to some extent, unusual properties.

In contrast to the prior art acid-pasted phthalocyanine, this product required no special treatment prior to drying out, in order to be usable as a pigment. When incorporated in a coating composition it exhibited a tinctorial strength at least as good as the best acid-pasted product, and it was as much as 10 to 15% stronger than many such prior art commercial products. It was substantially equal to such pigments in both hue and brilliance of shade, and had the pronounced advantage of a very much reduced tendency to "flocculate" in enamels and lacquer vehicles. The particles were so small in size as to be extremely difficult to resolve even by means of an electron microscope, but the best possible measurement was less than .1 micron. Measurement of the surface area of the particles by the Emmet gas-absorption technique, indicated a surface area of approximately 90 square meters per gram of pigment, as contrasted to an average of about 75 square meters per gram for normal acid-pasted samples.

*Example 2*

One hundred and eighty grams of the same partially chlorinated copper-phthalocyanine pigment as used in Example 1, together with 1500 cc. of 91% isopropanol were charged into a stainless steel ball mill with a capacity of about 6800 cc. and containing 13,000 grams of ⅛" steel shot. The mill was rotated at about 70% of the critical speed about four days, whereupon the charge was diluted with water and strained from the balls. After removal of the isopropanol by distillation, the aqueous slurry was extracted with 2–3% sulfuric acid, filtered, washed sulfate free, reslurried and again extracted with dilute ammonia. It was then filtered, washed alkali-free and dried in an oven at about 60° C. The bright blue powder was a highly desirable phthalocyanine pigment with substantially the same properties as the product of Example 1.

*Example 3*

Four hundred pounds of a poly-chloro copper-phthalocyanine, made according to the teachings of U. S. Patent 2,377,685, together with 2400 pounds of acetone (98–99% purity) and 40 pounds of crystalline sodium chromate were charged into a ball mill of approximately 1000 gallons capacity, containing a nominal 40% load of ⅛" steel balls. The mill was rotated at about 70% of the critical speed for about 24 hours and, after some dilution with additional acetone, the fluid mass was discharged from the mill. The acetone was removed by distillation and the resulting aqueous slurry was extracted first with dilute sodium hydroxide and, after filtering, washing, and reslurrying, was further extracted with 2% sulfuric acid to which has been added a small amount of sodium chromate. The pigment was then isolated by filtration, washing free of acid, and drying at about 60° C. The resulting bright green pigment exhibited a tinctorial strength at least as good as the best prior art pigment finished by acid-pasting and from 10–15% above that of many corresponding commercial products.

*Example 4*

Twelve grams of a polychloro copper-phthalocyanine, like that used in Example 3, 100 cc. of mineral spirits and 600 grams of ⅛" steel shot were charged into a one-half pint glass jar which was then rotated at a speed slightly less than the critical speed for about 5 days. The resulting pigment slurry was strained from the balls and the mineral spirits was removed by steam distillation. The pigment slurry was then extracted with dilute sulfuric acid, filtered, washed acid free and dried at about 60° C., to give a green powder with substantially the same properties as the product of Example 3.

*Example 5*

Sixty-five grams of a crude polychloro metal-free phthalocyanine, made according to the teachings of U. S. 2,377,685, together with 500 cc. of 91% isopropanol and 6.5 grams of crystalline sodium chromate were charged into a steel ball mill with a capacity of about 0.65 gallon and containing 4800 grams of ⅛" steel shot. The mill was rotated at about 70 R. P. M. for about 5 days. The charge was then diluted with water, separated from the balls and worked up by removal of the isopropanol, acid extraction, and alkali extraction. After drying at 60° C., there was obtained a bright green powder of excellent pigmentary properties and exhibiting a much yellower shade of green than the products of Examples 3 and 4.

It will be understood that the above examples are merely illustrative, and that the details thereof may be varied within the skill of those engaged in this art. Thus, while the above examples deal with certain specific members of the phthalocyanine family, the invention is of a general character and may be applied to other phthalocyanine coloring matters, for instance iron phthalocyanine, nickel phthalocyanine, cobalt phthalocyanine, and polychlor metal-free phthalocyanine. Furthermore, certain phthalocyanines, such as magnesium phthalocyanine, which cannot be finished by acid-pasting techniques because the metal is removed therefrom by strong sulfuric acid, can be finished successfully by the methods of this invention.

When this invention is applied to phthalocyanine compounds which are capable of existing in two crystalline forms, more specifically chlorine-free phthalocyanines, such as copper phthalocyanine or metal-free phthalocyanine (which are known to exist in alpha and beta crystalline forms), the process of this invention effects a shift in the shade of the color toward the green, and produces the same in a novel, pigmentary state (of the beta type crystals). The novel products thus obtained are more specifically described and claimed in copending applications of Frank W. Lane, Serial No. 79,902, and Otto Stallmann, Serial No. 79,915, filed simultaneously herewith.

Apart from the choice of liquid grinding aid, the conditions for grinding are not critical. The quantity of liquid must be sufficient to provide a freely flowing mass but may vary within wide limits. However, efficient operation of a ball mill with a liquid slurry requires a significant viscosity in the slurry being ground and too much liquid materially reduces the efficiency. The practical limits appear to vary from about 5 parts to about 10 parts of liquid per part of phthalocyanine pigment. Likewise, the mill load may vary over wide limits, it being usually expressed in terms of the volume of the mill load as related to the volume of the voids between the balls. Thus, with a material-void ratio of 1, the balls are barely covered and this represents a minimum load for practical operation. As the volume of load increases, the efficiency of grinding decreases with a practical upper limit for this operation at a material-void ratio of about 2.5. With a balance of all factors, the preferred ratio is between 1.5 and 2.0, but the invention is not limited thereto.

Instead of a conventional ball mill in which a horizontal cylindrical shell rotates and the balls fall under the influence of gravity, any other apparatus providing frequent contact of the grinding balls under vigorous impulse may be used. For instance, the bed of balls or grinding medium may be in a vertical cylinder provided with a mechanical agitator such as described in U. S. Patent 1,956,293.

It will be noted that in Example 3, describing the finishing of polychloro copper-phthalocyanine by grinding in acetone, we have added a small amount of sodium chromate to the slurry being ground. We have made the very surprising discovery, in attempting to apply the process of this invention to polychloro copper-phthalocyanine that, when such a pigment is ground in an organic liquid containing any appreciable amount of water, with iron or steel balls as the grinding medium, the pigment invariably becomes bluer and duller in shade. We now find that oxidizing agents, particularly those which are mildly alkaline in reaction, effectively prevent this undesired change in shade and we have, therefore, added the sodium chromate to the slurry being ground. Other mildly alkaline oxidizing agents such as sodium hypochlorite and sodium nitrite are equally effective for this purpose.

We also find that the same undesired change in color sometimes takes place during the acid extraction of the finished product, and that the presence of an oxidizing agent, such as the chromate ion, likewise inhibits the degrading effect at this point.

We claim as our invention:

1. A process of converting a crude phthalocyanine coloring matter into a finely divided, pigmentary state, which comprises subjecting the same to ball milling with grinding elements not greater than 0.25 inches in diameter, the pigment being suspended during the milling procedure in an organic liquid which is non-corrosive with respect to the grinding elements and which is sufficiently volatile to permit its separation from the pigment by steam distillation, the quantity of organic liquid employed being between 5 and 10 parts by weight for each part by weight of said pigment.

2. A process as in claim 1, the liquid being an oxygenated aliphatic compound free of acidic groups and aldehyde radicals.

3. A process as in claim 1, the liquid being an alcohol of not more than 4 carbon atoms.

4. A process as in claim 1, the liquid being acetone.

5. A process as in claim 1, the liquid being a hydrocarbon boiling essentially below 250° C.

6. A process of converting a crude halogenated phthalocyanine compound into a finely divided, pigmentary state, which comprises subjecting the same to ball milling with grinding elements of not less than 0.1 and not greater than 0.25 inches in diameter, the coloring compound being suspended during the grinding operation in from 5 to 10 times its own weight of acetone, whereby to produce a fluid mass, then separating the fluid mixture from the grinding elements, and removing the acetone by a distillation process.

7. A process as in claim 6, the phthalocyanine compound being a halogenated copper-phthalocyanine.

8. A process as in claim 6, the phthalocyanine compound being a polychloro copper-phthalocyanine, having over 14 chlorine atoms per molecule.

FRANK WESLEY LANE.
ARTHUR JOHN STRATTON.

REFERENCES CITED

The following references are of record in the file of this patent:

UNITED STATES PATENTS

| Number | Name | Date |
|---|---|---|
| 2,213,693 | Davies et al. | Sept. 3, 1940 |
| 2,238,243 | Black | Apr. 15, 1941 |
| 2,361,059 | Robertson | Oct. 24, 1944 |
| 2,378,283 | Bucher | June 12, 1945 |
| 2,486,304 | Loukomsky | Oct. 25, 1949 |

FOREIGN PATENTS

| Number | Country | Date |
|---|---|---|
| 517,475 | Great Britain | Jan. 31, 1940 |
| 569,402 | Great Britain | May 22, 1945 |